United States Patent
Shin et al.

(10) Patent No.: US 11,027,927 B2
(45) Date of Patent: Jun. 8, 2021

(54) ARTICLE CONVEYANCE APPARATUS

(71) Applicant: DAIFUKU CO., LTD., Osaka (JP)

(72) Inventors: Takeshi Shin, Shiga (JP); Tetsuji Nakae, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 16/738,045

(22) Filed: Jan. 9, 2020

(65) Prior Publication Data

US 2020/0223641 A1 Jul. 16, 2020

(30) Foreign Application Priority Data

Jan. 10, 2019 (JP) .............................. JP2019-002267

(51) Int. Cl.
*B65G 43/02* (2006.01)
*B65G 35/06* (2006.01)
*B61L 23/00* (2006.01)
*B61L 23/04* (2006.01)

(52) U.S. Cl.
CPC ............ *B65G 43/02* (2013.01); *B61L 23/005* (2013.01); *B61L 23/041* (2013.01); *B65G 35/06* (2013.01); *B65G 2203/0283* (2013.01); *B65G 2203/041* (2013.01)

(58) Field of Classification Search
CPC ...... B61L 23/005; B61L 23/041; B61F 9/063; B60K 31/0008; B65G 43/02; B65G 35/00; B65G 35/06; B65G 2203/041; B65G 2203/0283; G60K 9/00805; G01S 17/931
See application file for complete search history.

(56) References Cited

U.S. PATENT DOCUMENTS

| | | | | |
|---|---|---|---|---|
| 4,049,961 A | * | 9/1977 | Marcy | G01S 17/06 250/202 |
| 4,623,032 A | * | 11/1986 | Kemmer | B66F 17/003 180/169 |
| 5,831,717 A | * | 11/1998 | Ikebuchi | G01S 7/4815 356/4.01 |
| 6,163,755 A | * | 12/2000 | Peer | B61L 23/041 701/301 |
| 6,307,622 B1 | * | 10/2001 | Lewis | G01S 17/08 356/4.01 |

(Continued)

FOREIGN PATENT DOCUMENTS

JP 2002-132347 5/2002

*Primary Examiner* — Zachary L Kuhfuss
(74) *Attorney, Agent, or Firm* — Kusner & Jaffe

(57) ABSTRACT

An article conveyance apparatus including a front imaging device, a left-side imaging device, and a right-side imaging device. The front imaging device determines the presence or absence of an obstacle ahead of the imaging device and calculates a distance from the obstacle based on a comparison between images captured by a plurality of cameras. In a transition region from a linear section to a curved section, the left-side imaging device and the right-side imaging device capture images ahead of the left or the right side and determine the presence or absence of an obstacle ahead of the left or the right side. If a distance from a front obstacle is at most a predetermined threshold value and if it is determined that an obstacle is present ahead of the left or the right side, a controller avoids a collision between the article conveyance apparatus and the obstacle.

8 Claims, 5 Drawing Sheets

(56) References Cited

U.S. PATENT DOCUMENTS

| | | | | |
|---|---|---|---|---|
| 6,443,400 | B2* | 9/2002 | Murata | B61L 23/005 |
| | | | | 246/1 C |
| 6,592,080 | B2* | 7/2003 | Murata | B61L 23/005 |
| | | | | 180/169 |
| 9,156,473 | B2* | 10/2015 | Clarke | G01C 21/30 |
| 9,415,777 | B2* | 8/2016 | Clarke | B60W 40/076 |
| 9,533,626 | B2* | 1/2017 | Forni | B60R 11/04 |
| 10,569,770 | B1* | 2/2020 | You | B60W 30/09 |
| 2001/0003958 | A1 | 6/2001 | Murata et al. | |
| 2007/0031217 | A1* | 2/2007 | Sharma | B25J 9/0018 |
| | | | | 414/222.08 |
| 2018/0107225 | A1* | 4/2018 | Nguyen | G08G 1/166 |
| 2018/0345978 | A1* | 12/2018 | Fujii | B62D 15/0255 |
| 2018/0348752 | A1* | 12/2018 | Sakamoto | G05D 1/0055 |
| 2020/0223641 | A1* | 7/2020 | Shin | B65G 43/02 |

* cited by examiner

F I G. 2
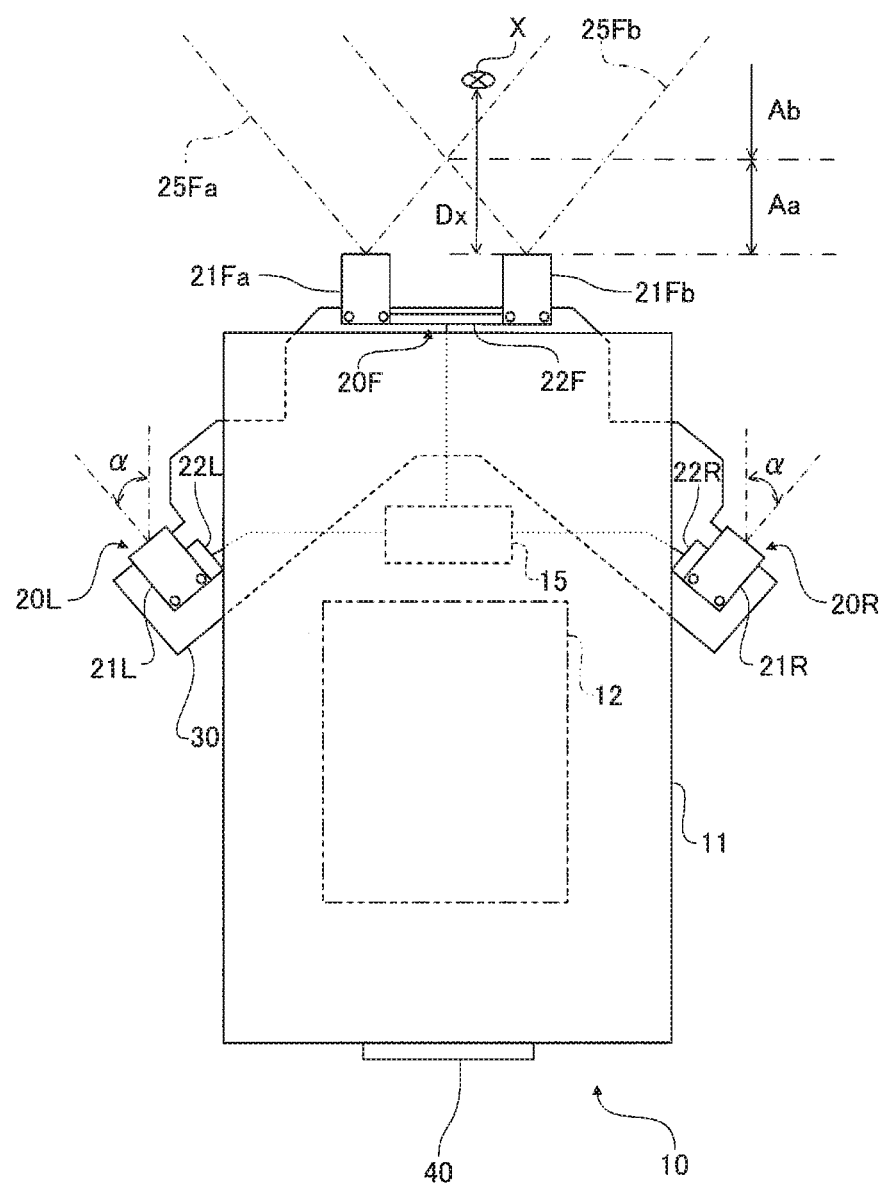

ARTICLE CONVEYANCE APPARATUS

FIELD OF THE INVENTION

The present invention relates to an article conveyance apparatus for conveying articles along a transportation path and particularly relates to an article conveyance apparatus on a transportation path including linear sections and curved sections.

BACKGROUND OF THE INVENTION

In some manufacturing facilities for industrial products, for example, article conveyance apparatuses are used for conveying articles along transportation paths provided in the facilities. In an operation of such an article conveyance apparatus, it is necessary to confirm that no obstacle is present ahead in a traveling direction during traveling. If a plurality of article conveyance apparatuses travel on a transportation path, in order to prevent the traveling article conveyance apparatus from colliding with another article conveyance apparatus ahead of the article conveyance apparatus, it is necessary to detect the presence or absence of an obstacle ahead of the traveling article conveyance apparatus.

As is disclosed in, for example, Japanese Patent Laid-Open No. 2002-132347, an article conveyance apparatus of the related art includes an optical reflection sensor that emits a fan-shaped light beam. The reflection sensor is provided as a forward looking sensor at the front of an article conveyance apparatus (e.g., an OHT vehicle).

The optical reflection sensor radiates a predetermined radiation region with a light beam and detects an obstacle ahead in the radiation region based on the reflected light.

In the article conveyance apparatus of the related art, however, the optical reflection sensor used for detecting an obstacle requires a driving mechanism for changing the direction of a light source so as to emit a fan-shaped light beam. Specifically, a point light source such as a laser cannot emit a light beam over a fan-shaped range at once and thus after the completion of detection at one point, a radiation angle is switched and another point is detected. This operation is to be repeated again and again.

In order to switch the radiation angle of the light source, it is necessary to generate a mechanical motion by using a driving mechanism, e.g., a motor, thereby wearing a device mechanism by friction or the like in each use. Thus, unfortunately, an obstacle detection mechanism including the optical reflection sensor of the related art has a short life.

Moreover, an obstacle detection mechanism including the optical reflection sensor of the related art performs many operations such as light emission, reception of reflected light, switching of a radiation angle, detection of an obstacle based on reflected light, which requires a large number of components. Furthermore, accurate and proper timing of operations requires complicated control, leading to quite an expensive mechanism.

In addition, an ordinary optical reflection sensor has a projection pitch (a switching width of a radiation angle) fixed at a certain angle (switchable only by a certain angle) and thus unfortunately, a small obstacle in the middle of the projection pitch cannot be detected.

Moreover, a change of the radiation range of a light beam by vibrations of an article conveyance apparatus may interfere with accurate detection by the optical reflection sensor of the related art. If a plurality of optical reflection sensors are provided, mutual interference may occur such that light emitted from one of the optical reflection sensors is erroneously detected as reflected light by the other optical reflection sensors. Thus, unfortunately, an obstacle detection mechanism including the optical reflection sensor of the related art may cause unstable operations with low reliability.

In view of the problems, an object of the present invention is to provide an article conveyance apparatus provided with an inexpensive obstacle detection mechanism with a long life and high reliability.

SUMMARY OF THE INVENTION

In order to solve the problems, an example of an embodiment of an article conveyance apparatus according to the present invention is an article conveyance apparatus that travels along a predetermined transportation path and conveys an article, the transportation path including a linear section and a curved section, the article conveyance apparatus including a conveyance body that holds the article, a front imaging device that captures an image in front of the conveyance body, a left-side imaging device that captures an image in left front of the conveyance body, and a right-side imaging device that captures an image in right front of the conveyance body, wherein the front imaging device includes a plurality of cameras, and determines the presence or absence of an obstacle ahead of the conveyance body and calculates a distance between the obstacle and the conveyance body, based on a comparison between images captured by the plurality of cameras; in a region where the conveyance body enters from the linear section to the curved section, the left-side imaging device and the right-side imaging device determine the presence or absence of an obstacle ahead of the left or the right side of the conveyance body based on an image captured in left front or right front of the conveyance body according to the turning direction of the curved section; and the article conveyance apparatus avoid a collision with an obstacle by at least reducing a traveling speed if the distance from the front obstacle is at most a predetermined threshold value, the distance being calculated by the front imaging device, and if one of the left-side imaging device and the right-side imaging device determines the presence of an obstacle ahead of the left or the right side of the conveyance body.

If an image captured by any one of the plurality of cameras includes a predetermined specific shape, the front imaging device preferably determines that an obstacle is present ahead of the conveyance body regardless of a comparison with an image captured by the other camera, and the front imaging device preferably calculates a distance between the obstacle and the conveyance body based on the size of the specific shape in the captured image.

The specific shape is preferably the shape of a detection marker provided in advance on the back side of the conveyance body of the other article conveyance apparatus.

The left-side imaging device and the right-side imaging device preferably capture images only in a curve transition region determined in advance in the transportation path.

The front imaging device, the left-side imaging device, and the right-side imaging device are preferably mounted at predetermined angles in a predetermined layout on a common mounting plate.

According to the example of the embodiment of the article conveyance apparatus of the present invention, an obstacle is detected by using the imaging devices. This eliminates the need for a driving mechanism for switching the radiation angle of a light source in the optical reflection sensor of the related art, achieving an obstacle detection mechanism with a long life. Moreover, the article conveyance apparatus has a small number of components and thus is relatively inexpensive.

The imaging devices capture all objects included in the imaging ranges of the devices, thereby detecting small obstacles that may be undetectable by the optical reflection sensor of the related art.

The plurality of imaging devices do not mutually interfere with one another unlike an optical reflection sensor. Even if the imaging ranges are slightly changed by vibrations, an obstacle in the imaging ranges can be detected and a stable operation for detecting an obstacle can be obtained, achieving high reliability over the article conveyance apparatus.

BRIEF DESCRIPTION OF THE DRAWINGS

FIG. 2 is a plan view illustrating the layout of imaging devices;

DETAILED DESCRIPTION OF THE INVENTION

Figure 1:
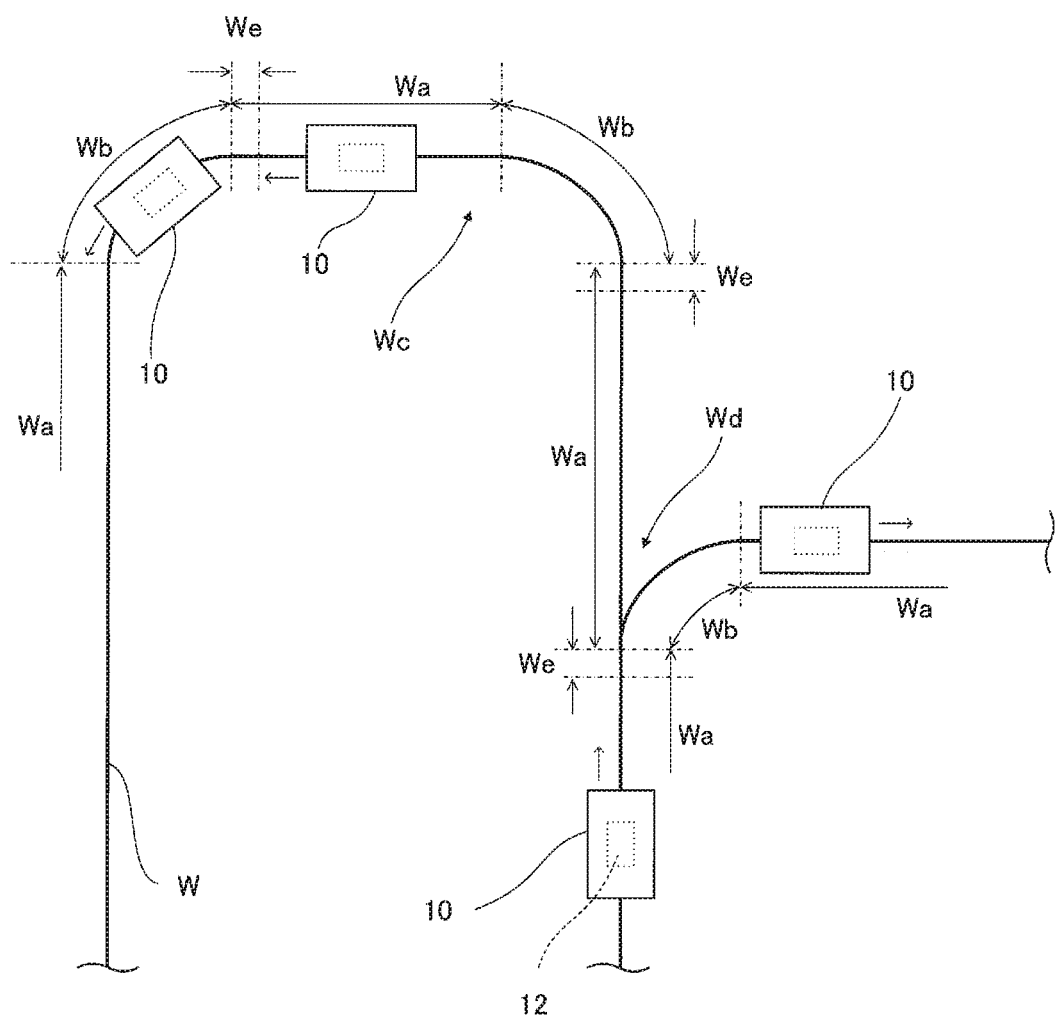
FIG. 1 is a plan view illustrating a part of a transportation path in an example of an embodiment of an article conveyance apparatus according to the present invention.

FIG. 1 illustrates an example of an embodiment of an article conveyance apparatus according to the present invention. In a facility (e.g., an industrial product manufacturing facility) where an article conveyance apparatus 10 is used, a transportation path W is determined in advance and the article conveyance apparatus 10 travels along the transportation path W so as to convey an article 12. In the facility of FIG. 1, a plurality of the article conveyance apparatuses 10 travel in the transportation path W.

As illustrated in FIG. 1, the transportation path W includes linear sections Wa and curved sections Wb. The curved section Wb connects the linear sections Wa laid in different directions. The curved section Wb is provided at, for example, a turning section Wc of the transportation path W and at a branch section Wd where the transportation path W branches into at least two sections. In the transportation path W in FIG. 1, the left curved section Wb is provided at each of the entrance and exit of the turning section Wc. Furthermore, the branch section Wd includes the right curved section Wb. The article conveyance apparatus 10 traveling from the linear section Wa to the right branch path in FIG. 1 needs to pass through the right curved section Wb.

Along the transportation path W, a rail (not illustrated) is provided, for example, so as to be suspended from the ceiling of the facility. The article conveyance apparatus 10 in FIG. 2 holds the article 12, for example, so as to grip the article 12 with an arm (not illustrated) attached to a conveyance body 11. In this state, the article conveyance apparatus 10 travels with wheels (not illustrated) supported so as to rotate on the top surface of the rail, thereby conveying the article 12 along the transportation path W.

Since the plurality of article conveyance apparatuses 10 travel in the transportation path W of FIG. 1, it is necessary to avoid collision between the article conveyance apparatuses 10. Thus, each of the article conveyance apparatuses 10 is provided with a mechanism for detecting an obstacle in the traveling direction.

In the present embodiment, a front imaging device 20F, a left-side imaging device 20L, and a right-side imaging device 20R in FIG. 2 are provided to detect an obstacle. The imaging devices are combinations of camera devices for capturing images and image processors for processing the images.

FIG. 2 is a schematic plan view of the article conveyance apparatus 10. In this configuration, a mounting plate 30 made of hard materials such as metal and resin is fixed at the bottom of the conveyance body 11 that holds the article 12. The front imaging device 20F, the left-side imaging device 20L, and the right-side imaging device 20R are attached to the common mounting plate 30. As illustrated in FIG. 2, the mounting plate 30 attached to the bottom of the conveyance body 11 is shaped and measured so as to extend out of the conveyance body 11 to the front side (traveling direction), the left side, and the right side from the conveyance body 11 in plan view. The imaging devices are attached to the extended parts.

The front imaging device 20F is attached to the front of the conveyance body 11 in the traveling direction along the transportation path W. The front imaging device 20F includes a first front camera 21Fa that is directed forward and is placed somewhat on the left side, a second front camera 21Fb that is directed forward and is placed somewhat on the right side, and a front image processor 22F that is connected to the first front camera 21Fa and the second front camera 21Fb and processes images captured by the cameras.

The left-side imaging device 20L is attached to the left side of the conveyance body 11 (left side with respect to the traveling direction). The left-side imaging device 20L includes a left-side camera 21L and a left-side image processor 22L that processes images captured by the camera. The left-side camera 21L is inclined to the left by a predetermined angle α with respect to the front direction (traveling direction).

The right-side imaging device 20R is attached to the right side of the conveyance body 11 (right side with respect to the traveling direction). The right-side imaging device 20R includes a right-side camera 21R and a right-side image processor 22R that processes images captured by the camera. The right-side camera 21R is inclined to the right by a predetermined angle α with respect to the front direction (traveling direction).

On the mounting plate 30, structure parts (e.g., a threaded hole) for attaching the imaging devices (the front imaging device 20F, the left-side imaging device 20L, and the right-side imaging device 20R) are provided at predetermined positions. The imaging devices are fixed to the structure parts by screwing or the like, so that the imaging devices are attached at the foregoing angles to the mounting plate 30 in the foregoing layout.

The article conveyance apparatus 10 further includes a controller 15 (e.g., a processor or a microcomputer) that controls the operations of the article conveyance apparatus 10. The image processors (the front image processor 22F, the left-side image processor 22L, and the right-side image processor 22R) of the imaging devices are connected to the controller 15, and data on the image processing results of the image processors is transmitted to the controller 15.

The front imaging device 20F can calculate a distance to an object in front of the conveyance body 11. The principle will be described below. First, the first front camera 21Fa and the second front camera 21Fb that are provided for the front imaging device 20F are directed in the same direction (forward) and are displaced from each other in a direction (laterally) crossing to the direction (forward). Thus, when the cameras capture images of an object in front of the cameras, the position of the object in front of the cameras varies in an image depending upon whether the image is captured by the first front camera 21Fa or the second front camera 21Fb.

Figure 3:
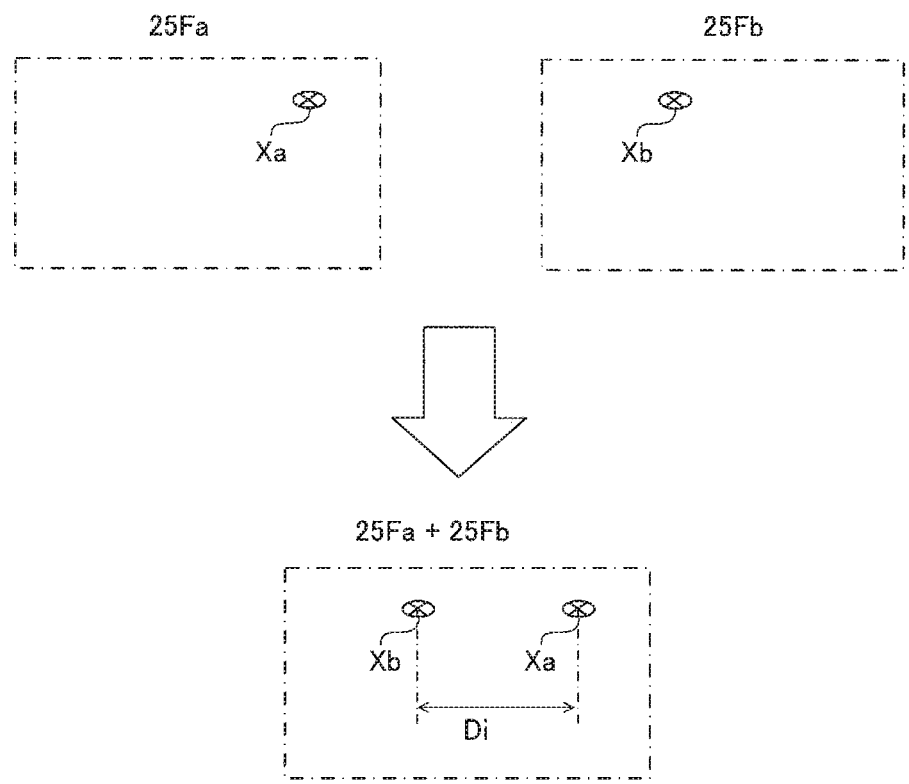
FIG. 3 illustrates the principle of distance calculation by a front imaging device.

In this example, as illustrated in FIG. 2, a subject X is present in front of the article conveyance apparatus 10. The imaging range of the first front camera 21Fa is denoted as a first imaging range 25Fa and the imaging range of the second front camera 21Fb is denoted as a second imaging range 25Fb. If images captured by the cameras are rectangular, as illustrated in the upper part of FIG. 3, the subject X in the rectangles is captured as a right subject Xa in the first imaging range 25Fa and a left subject Xb in the second imaging range 25Fb. When the two images are superimposed, as illustrated in the lower part of FIG. 3, a displacement between the right subject Xa and the left subject Xb in the image, that is, a parallax Di can be calculated. The parallax Di varies depending on a distance Dx (FIG. 2) from the camera to the subject X captured by the camera. As the distance Dx increases, the parallax Di decreases. Thus, the image processor 22F of the front imaging device 20F can calculate the distance Dx to the subject X based on the parallax Di.

However, the distance Dx can be calculated based on the parallax Di only if the subject X can be captured by both of the first front camera 21Fa and the second front camera 21Fb, that is, as illustrated in FIG. 2, the subject X is located in a parallax determinable region Ab where the first imaging range 25Fa and the second imaging range 25Fb are superimposed. If the subject X is located quite close to the article conveyance apparatus 10, that is, in an adjacent region Aa illustrated in FIG. 2, the subject X may be captured by only one of the first front camera 21Fa and the second front camera 21Fb. In this case, the distance Dx cannot be calculated based on the parallax Di.

Figure 4:
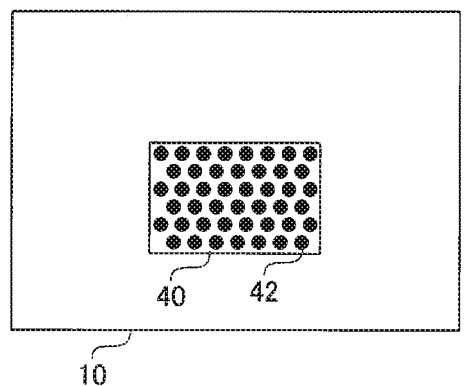
FIG. 4 is a rear view illustrating an example of a detection marker provided on the back side of the article conveyance apparatus.

Thus, a marker plate 40 illustrated in FIG. 4 is attached to the back side of the conveyance body 11 of the article conveyance apparatus 10 in order to detect the front article conveyance apparatus 10 by the rear article conveyance apparatus 10 using the front imaging device 20F even if the plurality of article conveyance apparatuses 10 are quite close to each other. The marker plate 40 has detection markers 42 in predetermined specific shapes. In this configuration, the detection markers 42 are multiple circles disposed at equal grid spacings in a plane on the marker plate 40. If the multiple circles disposed at the predetermined intervals are collectively handled as a single detection marker 42, a partially captured image of the marker can be handled as the detection of the detection marker 42. Moreover, the circles disposed at the predetermined intervals facilitate distance calculation, which will be described later.

When the rear article conveyance apparatus 10 captures an image of the detection marker 42 on the back side of the front article conveyance apparatus 10 by means of the first front camera 21Fa or the second front camera 21Fb of the front imaging device 20F, the detection marker 42 clearly appears in the captured image within a certain distance from the front article conveyance apparatus 10. Thus, the front image processor 22F can detect the specific shape of the detection marker 42 in the captured image. The shorter the distance from the front article conveyance apparatus 10, the larger the size of the captured detection marker 42 in an image. This allows the front image processor 22F to calculate a distance from the front article conveyance apparatus 10 based on the size of the detection marker 42 in the image. In this way, the front imaging device 20F can detect the presence of the front article conveyance apparatus 10 depending upon whether the specific shape of the detection marker 42 is included in an image captured by the first front camera 21Fa or the second front camera 21Fb, and calculate a distance from the front article conveyance apparatus 10 based on the size of the detection marker 42 in the image.

Likewise, the left-side imaging device 20L and the right-side imaging device 20R can also detect the presence or absence of the other article conveyance apparatus 10 on the left or right of the article conveyance apparatus 10 depending upon whether or not the detection marker 42 is included in an image captured by the left-side camera 21L or the right-side camera 21R.

Figure 5:
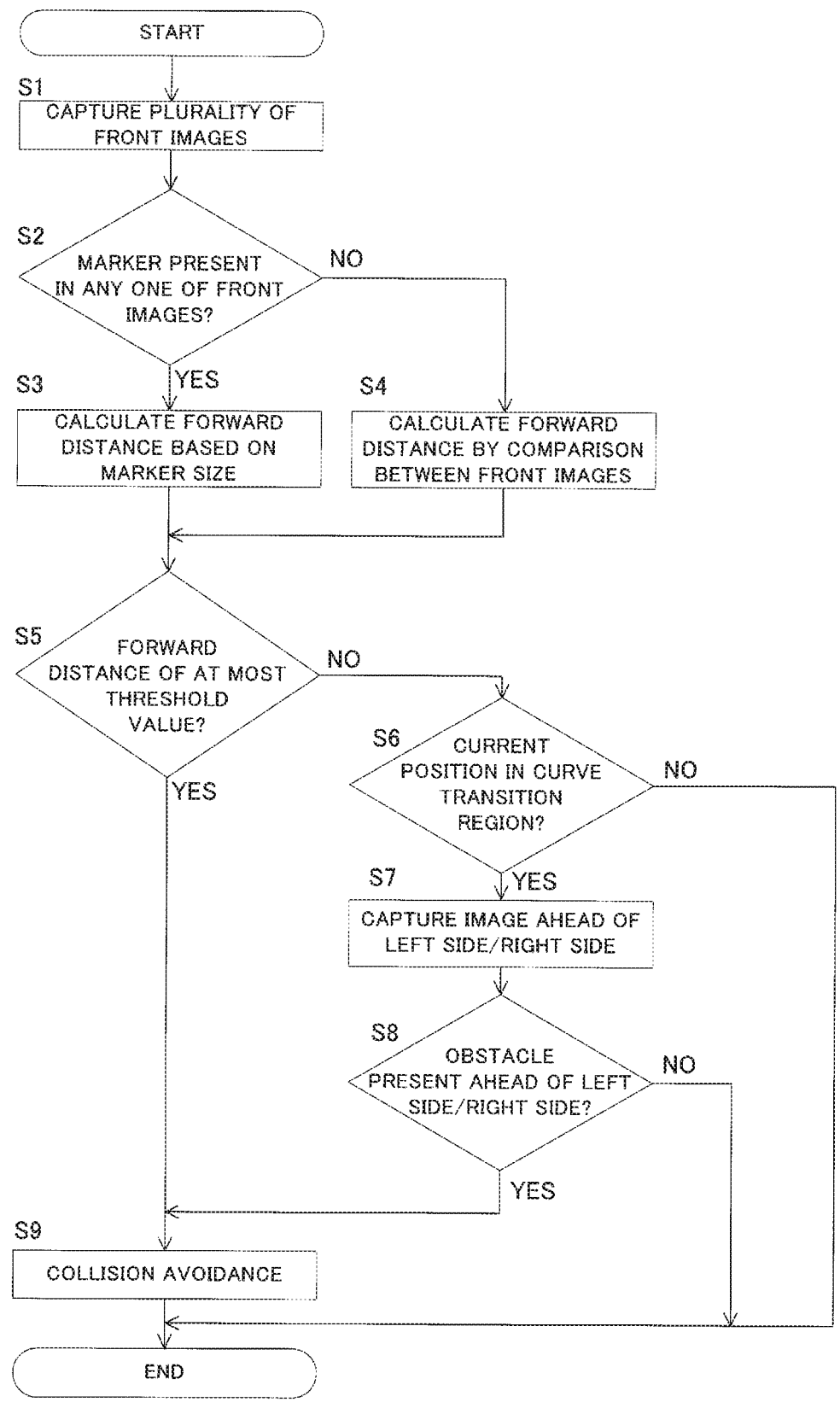
FIG. 5 is a flowchart of processing for detecting an obstacle.

A flowchart in FIG. 5 indicates processing for detecting an obstacle in the article conveyance apparatus 10 provided with the front imaging device 20F, the left-side imaging device 20L, and the right-side imaging device 20R. During a movement of the article conveyance apparatus 10 along the transportation path W, the processing for detecting an obstacle is started in each predetermined detection period (e.g., one second) (START).

When the processing for detecting an obstacle is started, a plurality of (two) images are first captured from the front (front images) by the first front camera 21Fa and the second front camera 21Fb of the front imaging device 20F (step S1).

The front image processor 22F determines whether or not the detection marker 42 is included in the front image captured by the first front camera 21Fa or the front image captured by the second front camera 21Fb (step S2).

If the detection marker 42 is included in the front image (step S2-YES), the front image processor 22F calculates a distance (forward distance) between the article conveyance apparatus 10 including the front image processor 22F and the front article conveyance apparatus 10 based on the size of the detection marker 42 in the image (step S3).

Even if the back side of the front article conveyance apparatus 10 is included in the front image, the front image processor 22F cannot identify the shape of the detection marker 42 in the case of a long forward distance. In the absence of the front article conveyance apparatus 10, the detection marker 42 is not included in the front image. If it is determined that the detection marker 42 is not included in the front image (step S2-NO), as described above, the front image processor 22F compares the front image captured by the first front camera 21Fa and the front image captured by the second front camera 21Fb and calculates a forward distance based on the parallax Di (step S4).

The controller 15 of the article conveyance apparatus 10 receives data on the forward distance calculated by the front image processor 22F in step S3 or step S4 and compares the forward distance and a predetermined threshold value (step S5). If the forward distance is not larger than the threshold value (step S5-YES), the controller 15 determines that a collision may occur with a front obstacle (for example, the other article conveyance apparatus 10) and performs collision avoidance (step S9). In the collision avoidance, processing for avoiding a collision between the article conveyance apparatus 10 and an obstacle is performed. For example, the speed of the article conveyance apparatus 10 is reduced, the running of the conveyance apparatus 10 is stopped, or a warning is released to an operator in the facility. If the obstacle is the other article conveyance apparatus 10 that is running late due to, for example, a delay of transportation, a collision can be avoided only by reducing the speed of the article conveyance apparatus 10. After the collision avoidance is performed, the detection of an obstacle is kept on standby until the subsequent detection period (END).

If the forward distance is larger than the threshold value in step S5 (step S5-NO), the controller 15 determines that an obstacle (that may collide with the article conveyance apparatus) is not present ahead. In this case, the controller 15 then confirms whether the article conveyance apparatus 10 is currently located in a curve transition region We that is determined in advance in the transportation path W (Step S6). If any obstacle is not included in the front image, it is only necessary to record a proper value sufficiently larger than the threshold value or "INFINITY" (a special value indicating "infinity") as a forward distance. Also in this case, it is inevitably determined that any obstacle is not present ahead.

The current position of the article conveyance apparatus 10 may be confirmed according to various methods. For example, marks such as bar codes indicating position information are placed at points on the rail constituting the transportation path W, so that the controller 15 can locate the current position by confirming the marks with a bar-code reader or the like. Alternatively, a device (e.g., a GPS) for calculating the current position of the article conveyance apparatus 10 via radio communications may be provided.

If the current position is located in the curve transition region We (step S6-YES), the left-side imaging device 20L captures an image ahead of the left side (left front image) of the article conveyance apparatus 10 and the right-side imaging device 20R captures an image ahead of the right side (right front image) of the article conveyance apparatus 10 (step S7).

The left-side image processor 22L and the right-side image processor 22R determine whether the left front image or the right front image includes an obstacle, and typically determine whether or not the image includes the detection marker 42 of the other article conveyance apparatus 10 located ahead of the left or the right side of a curve (step S8).

When the left-side image processor 22L or the right-side image processor 22R detects the presence of an obstacle (step S8-YES), the obstacle is present ahead of the curve. Thus, a signal for indicating the presence of the obstacle is transmitted to the controller 15 and then the controller 15 performs the collision avoidance (step S9). If the current position of the article conveyance apparatus 10 is not located in the curve transition region We (step S6-NO) or if the current position is located in the curve transition region We but an obstacle is not included in the left front image or the right front image (step S8-NO), the collision avoidance is not performed and the processing for detecting an obstacle is terminated (END).

In the detection of an obstacle by using the front imaging device 20F, the left-side imaging device 20L, and the right-side imaging device 20R, an obstacle can be detected while the angles of the imaging devices are fixed. Unlike in the optical reflection sensor of the related art, a mechanical operation for switching a radiation angle is not necessary, hardly causing mechanical wear. Hence, even if an obstacle is frequently detected at intervals of, for example, one second, the mechanical lives of the devices are unlikely to decrease.

Since the imaging devices capture all objects included in the imaging ranges of the devices, the method of detecting an obstacle can detect small obstacles that may be undetectable by the optical reflection sensor of the related art. The detection of the other article conveyance apparatus 10 was mainly described above. For example, if the shape and the color of an object assumed to be an obstacle are registered in advance in the imaging devices or an image captured in the absence of an obstacle is registered as a reference image in the imaging devices, various obstacles can be detected by, for example, determining the presence of an obstacle in the case of a large difference between a captured image and the reference image.

In the article conveyance apparatus 10, the imaging devices are mounted so as to be fixed at the predetermined angles in the predetermined layout on the common mounting plate 30. Thus, even if the running article conveyance apparatus 10 slightly vibrates, the positions of the imaging devices are not considerably changed and the orientations of the cameras are stabilized.

In the foregoing configuration, the marker plate 40 having the detection marker 42 in the specific shape is attached to the back side of the conveyance body 11. If a characteristic shape, e.g., a logo of a maker is provided on the back side of the conveyance body 11 instead of the marker plate 40, the specific shape may be detected. Since the collision avoidance is performed in the presence of a specific shape in a captured image, a collision can be avoided in emergency without a safety device specific for emergency by placing a sign board, in which a specific shape is drawn, on the transportation path W under emergency conditions such as trouble in the facility.

In the foregoing description, an obstacle is detected ahead of the left and the right sides in the curve transition region We preceding the curved section Wb. An obstacle may be detected ahead of the left and the right sides also in the curved section Wb (that is, in the linear section Wa following the exit of the curve). The detection of an obstacle in the curve transition region We was particularly mentioned because the article conveyance apparatuses 10 are likely to collide with each other at a transition from the curve transition region We to the curved section Wb. The running article conveyance apparatuses 10 require deceleration in the curved sections Wb and thus tend to be jammed in the curved sections Wb. Thus, it is desirable to confirm the presence or absence of the other article conveyance apparatus 10 in the curved section Wb ahead of the article conveyance apparatus 10 entering a region preceding the curved section Wb, that is, the curve transition region We at a transition from the linear section Wa to the curved section Wb.

In the foregoing configuration, the left-side imaging device 20L and the right-side imaging device 20R capture images only in the curve transition region We. Images are captured only in necessary situations, reducing the consumption of used power. If it can be determined whether the curve transition region We is a transition region to the left curved section Wb or a transition region to the right curved section Wb according to the current position of the article conveyance apparatus 10, power consumption is further reduced only by capturing a left front image or a right front image according to the turning direction (such as, only the left-side imaging device 20L is operated before the left curved section Wb). Alternatively, in regions other than the curve transition region We, images may be captured by the left-side imaging device 20L and the right-side imaging device 20R and an obstacle may be detected on the right and the left. In this case, for example, an operator approaching the article conveyance apparatus 10 from the left or the right can be detected. If the transportation path W is sufficiently separated from other devices in the facility and erroneous detection of other devices is unlikely to occur in regions other than the curve transition region Wc, the current position of the article conveyance apparatus 10 may not be located and the left-side imaging device 20L and the right-side imaging device 20R may capture images all the time.

REFERENCE SIGNS LIST 10 article conveyance apparatus
12 article
30 mounting plate
40 marker plate
42 detection marker
20F front imaging device
20L left-side imaging device
20R right-side imaging device
W transportation path
Wa linear section
Wb curved section
Wc curve transition region

What is claimed is:

1. An article conveyance apparatus that travels along a predetermined transportation path and conveys an article, the transportation path including a linear section and a curved section, the article conveyance apparatus comprising:
a conveyance body that holds the article,
a front imaging device that captures an image in front of the conveyance body,
a left-side imaging device that captures an image in left front of the conveyance body, the left-side imaging device inclined toward a left side of the conveyance body with respect to the front of the conveyance body, and
a right-side imaging device that captures an image in right front of the conveyance body, the right-side imaging device inclined toward a right-side of the conveyance body with respect to the front of the conveyance body,
wherein the front imaging device includes a plurality of cameras, and determines presence or absence of an obstacle ahead of the conveyance body and calculates a distance between the obstacle and the conveyance body, based on a comparison between images captured by the plurality of cameras;
in a region where the conveyance body enters from the linear section to the curved section, the left-side imaging device and the right-side imaging device determine presence or absence of an obstacle ahead of a left or a right side of the conveyance body based on an image captured in left front or right front of the conveyance body according to a turning direction of the curved section;
the article conveyance apparatus avoid a collision with an obstacle by at least reducing a traveling speed if the distance from the front obstacle is at most a predetermined threshold value, the distance being calculated by the front imaging device, and if one of the left-side imaging device and the right-side imaging device determines presence of an obstacle ahead of the left or the right side of the conveyance body, and
wherein the left-side imaging device and the right-side imaging device capture images only in a curve transition region determined in advance in the transportation path.

2. The article conveyance apparatus according to claim 1, wherein if an image captured by any one of the plurality of cameras includes a predetermined specific shape, the front imaging device determines that an obstacle is present ahead of the conveyance body regardless of a comparison with an image captured by the other camera, and the front imaging device calculates a distance between the obstacle and the conveyance body based on a size of the specific shape in the captured image.

3. The article conveyance apparatus according to claim 2, wherein the specific shape is a shape of a detection marker provided in advance on a back side of the conveyance body of the other article conveyance apparatus.

4. The article conveyance apparatus according to claim 3, wherein the left-side imaging device and the right-side imaging device capture images only in a curve transition region determined in advance in the transportation path.

5. The article conveyance apparatus according to claim 3, wherein the front imaging device, the left-side imaging device, and the right-side imaging device are mounted at predetermined angles in a predetermined layout on a common mounting plate.

6. The article conveyance apparatus according to claim 2, wherein the left-side imaging device and the right-side imaging device capture images only in a curve transition region determined in advance in the transportation path.

7. The article conveyance apparatus according to claim 2, wherein the front imaging device, the left-side imaging device, and the right-side imaging device are mounted at predetermined angles in a predetermined layout on a common mounting plate.

8. The article conveyance apparatus according to claim 1, wherein the front imaging device, the left-side imaging device, and the right-side imaging device are mounted at predetermined angles in a predetermined layout on a common mounting plate.

* * * * *